United States Patent Office 2,905,696
Patented Sept. 22, 1959

2,905,696

TRITHIONES

Ellis K. Fields, Chicago, Ill., assignor to Standard Oil Company, Chicago, Ill., a corporation of Indiana No Drawing. Application February 21, 1957
Serial No. 641,443

9 Claims. (Cl. 260—327)

My invention relates to the production of substituted trithiones and more particularly provides a simple process for preparing aryl substituted trithiones from ring substituted aliphatic hydrocarbons by catalyzed reaction with sulfur.

Trithiones have been previously prepared by heating selected olefinic compounds with sulfur at elevated temperatures. Because of low yields by this process from expensive or unavailable olefinic compounds in a state requiring costly and tedious purification procedure, the trithiones have remained chemical curiosities.

It has now been discovered that ring substituted aliphatic hydrocarbons, e.g., alkyl aromatics of cumene like structure, can be reacted with sulfur at moderately elevated temperatures to produce aryl substituted trithiones by employing a basic catalyst. In particular, I have discovered that for direct conversion of alkyl aromatics to corresponding aryl trithiones, it is essential to use an alkyl aromatic hydrocarbon which comprises a benzenoid ring containing a paraffin side chain of at least three carbon atoms in length in which the paraffin is attached to the ring at the second carbon atom of the chain. The benzenoid ring may be a phenyl or a fused ring structure. I have further discovered that the use of a basic reacting catalyst is essential in promoting the desired reaction. The catalyst may be either inorganic or organic, and as strong as potassium hydroxide or di-orthotolylguanidine or as weak as activated alumina or quinoline. I have found, however, that markedly faster reaction rates and surprisingly better product quality are achieved with catalysts which are strong organic bases, e.g. diaryl guanidines, which are soluble in the hydrocarbon raw material and which are stable under the conditions of reaction.

The aryl trithione products may be recovered in good yield by simple filtration and washing. By contrast, conventional preparation using olefinic compounds requires (a) precipitation of the impure trithione from solution as a mercuric chloride complex; (b) treatment of the complex wih benzene and sodium sulfide solution; (c) separating and evaporating the benzene, and (d) crystallization of the residue.

In the practice of the invention, the hydrocarbon starting material is reacted with sulfur at a temperature of about 140°–230° C. in the presence of a small, catalytic amount of the base. An excess of the hydrocarbon relative to sulfur is employed with advantage. In contrast to the preparation of trithiones from olefins by reaction with sulfur where an excess of sulfur must be employed, the use of excess hydrocarbon facilitates recovery of product by simple cooling and crystallization from unreacted hydrocarbon. The product is recovered in a satisfactorily pure state, requiring only washing with benzene or other light hydrocarbon solvent in contrast to the tedious purification necessary to remove sulfur contamination. A further advantage of the catalytic process of the invention is that the preferred temperature of reaction is the reflux temperature, or about 180°–190° C. for the higher boiling hydrocarbons, which permits operation at atmospheric pressure. The olefin-sulfur, non-catalytic process requires operation at higher temperatures, ordinarily making pressure equipment necessary. If desired, however, the reaction may be conducted continuously at somewhat higher temperature under elevated pressure.

As mentioned above, a structure analogous to that of cumene (isopropylbenzene) appears to be necessary for the conversion to trithiones by direct reaction with sulfur. As exemplified by cumene, the starting material should have a saturated terminal normal chain of at least 3 carbon atoms, with the aryl ring attached to the second carbon atom. Thus, alkyl aromatics such as cumene and alkyl-substituted cumenes such as para-cymene and p-tertiary-butyl-cumene may be reacted to substantial completion with from 5 to 50% sulfur at a temperature below 200° C. in one to several hours depending upon the temperature of the reaction and the structure of the starting hydrocarbon. For example, para-cymene may require less than 8 hours for 80% completion of the reaction, whereas p-t-butyl cumene may require as much as about 70 hours. Normal propylbenzene and tertiary butylbenzene, on the other hand, lack a cumene-like structure and accordingly at similar temperatures in the presence of a catalyst for about 200 and 100 hours respectively reacted with only minor portions of the sulfur.

In addition to cumene and its ring-substituted derivatives, the starting material may have one terminal hydrogen in the isopropyl replaced by an alkyl or aryl group. In this event, the trithione formed will have that group attached to the trithione ring. Thus, isoamyl benzene forms 1-phenyl 2-ethyl trithione.

The isopropyl group has been found to be activated for trithione formation by benzenoid rings other than the mononuclear benzene and its homologues. Isopropyl indane (with the isopropyl group attached to the benzenoid ring), isopropyl naphthalene, and isopropyl phenanthrene are typical of these reactive polynuclear compounds.

Non-hydrocarbon substituents on the rings may decompose under the conditions of reaction. Chlorocumene, for example, is dechlorinated, apparently as an initial reaction step, and, then proceeds to form phenyltrithione. Nitro-cumene is similarly decomposed. The ring portion of the starting hydrocarbon may be advantageously substituted with additional alkyl or other hydrocarbon groups, usually at the ortho or para position relative to the essential iso paraffinic group.

For use as bearing corrosion inhibitors in lubricating oils, para-alkyl trithiones may be produced with particular advantage from corresponding para-alkyl cumenes. Other substituents which do not interfere by side reaction or steric hindrance may be located in the ring structure. Although the 2-carbon atom to which the aromatic ring is attached should not take the form of tertiary butyl or neopentyl structure, the chain may contain additional substituents, e.g. an aliphatic, aromatic or cyclo aliphatic group substituted at the 3-carbon atom.

The overall reaction of cumene-like reactants may be illustrated thus:

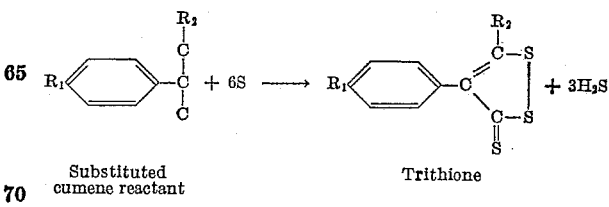

Substituted cumene reactant → Trithione

The corresponding aryl trithiones are not readily produced by catalytic sulfurization of the corresponding terpene or aryl substituted olefin. For example, the terpene dl-limonene reacts under the processing conditions of the invention to yield a trithione having an aromatic ring fused to a trithione ring, as shown:

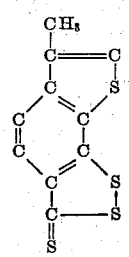

Also, the aryl substituted olefin alpha-methylstyrene reacts under the process and conditions of the invention to give only 25% of 2-phenyl trithione, which is considerably less than the 50 to 80% yields achieved by sulfurizing ring substituted saturated hydrocarbons. Thus, it is apparent that the respective mechanisms of trithione formation are radically different depending on whether the side chain is paraffinic or olefinic in nature.

While it is demonstrated that alkyl trithione formation is catalyzed by any basic material stable at the reaction temperatures employed, di-orthotolylguanidine when used as the catalyst appears to result in lighter colored trithiones and improved yields relative to other basic catalysts tested. Both aliphatic and aromatic guanidines and amines however are effective. For example, primary, secondary and tertiary butyl amines, examples of useful hydrocarbon-soluble liquid aliphatic amines, produced reaction rates substantially equivalent to that produced by di-orthotolylguanidine. Where the catalyst is inorganic, as in the case of the strong base potassium hydroxide, or the nearly amphoteric activated alumina, the catalyst is advantageously used in finely divided form. It may be added as such or in the form of a suspension in an inert solvent or hydrocarbon feed. Only small concentrations of the catalyst are necessary. Thus, the catalyst is used in concentrations of about 0.01 to 2% by weight, typically at about 0.2 weight percent. Although only the small proportion of the catalyst need be employed, its use is essential. For example, when the reaction of sulfur and para-cymene was attempted without a catalyst by refluxing 67 grams of para-cymene and 24 grams of sulfur for 72 hours, very little hydrogen sulfide was evolved and upon cooling 22 grams of sulfur were precipitated. No trithione could be isolated.

The following examples will illustrate the process of the invention in greater detail as applied to the preparation of specific aryl trithiones, and in the testing of various basic catalysts. In general, the reaction was continued until no free sulfur remained, as determined by heating an aliquot sample dissolved in an inert hydrocarbon (high-boiling ligroin or refined oil) with a polished copper strip at 100° C. for 1 hour. Free sulfur will blacken the strip.

*Example I*

In a typical preparation, a mixture of 1108 g. (8.25 moles) p-cymene, 400 g. (12.5 g. at.) sulfur and 8.2 g. ditolylguanidine was refluxed at 185° C. for 21 hours. Hydrogen sulfide evolved steadily. The mixture was then kept at 5° C. for 2 hours to allow the trithione to crystallize. The red crystals were collected on a filter, washed with 400 ml. of 1:3 benzene:hexane, and sucked dry. There was obtained 355 g. (77%) 2-p-tolyl-trithione, M.P. 119–120° C. After one crystallization from benzene it melted at 122.5–123° C.

Vacuum distillation of the filtrate from the trithione crystals gave 575 g. p-cymene ($b_{10}$ 34–39° C.).

*Example II*

A mixture of 1500 g. cumene, 574 g. S and 12 g. di-ortho-tolyl guanidine was refluxed at 156° C. for 174 hours, at which time no free sulfur remained. The mixture was coled to 10° C., the red crystals of 2-phenyl trithione collected on a filter and washed with 100 cc. cold benzene. There resulted 489 g., 50% phenyl trithione, M.P. 122° C. The mixed melting point with an authenic sample of 2-phenyl trithione (prepared from α-methyl styrene and sulfur according to B. Bottcher and A. Luttringhaus, Ann. 557, 89 (1947)) was 122–123° C. 945 g. cumene was recovered by distillation of the filtrate.

*Example III* p-t-Butyl cumene, B.P. 220–224° C. was prepared according to H. Barbier, Helvetica Chim. Acta 19, 1345 (1936). A mixture of 105.6 grams (0.6 mole) of p-t-butyl cumene, 28.8 grams of (0.9 g. at.) sulfur and 0.4 grams (0.3%) of di-o-tolyl-guanidine was stirred at 184° C. for 24 hours, cooled to 5° C. for 4 hours and filtered, giving 21 grams of red crystals. Seventy grams p-t-butyl cumene, B.P. 77°–82° C./4.2, were recovered from the filtrate, the crystals were recrystallized from 5W lubricating oil, giving brilliant golden leaflets, M.P. 145° C., which analyzed for 2-p-t-butyl phenyl trithione.

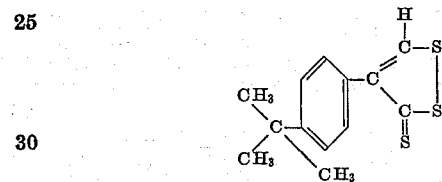

*Analysis:*—Calculated for $C_{13}H_{14}S_3$: C, 58.61%, H. 5.27%; S, 36.09%; molecular weight 266. Found: C, 59.25%; H, 5.20%; S, 35.70%; molecular weight, 262.

*Example IV*

A mixture of 313.2 cc. (2 moles) of p-cymene, 96 grams (3 gram atoms) of sulfur, and 10 grams of 80–200 mesh activated alumina was stirred at reflux, 363° F. Hydrogen sulfide was evolved. After 20 hours, the mixture was cooled, giving 68 grams of p-tolyl trithione (61% yield) melting at 122° C. The trithione filtrate was distilled, giving 120 grams of recovered p-cymene, and leaving 83 grams of reddish viscous residue which analyzed 19.80% S.

*Example V*

A mixture of 156.6 cc. (1 mole) of p-cymene, 48 grams (1.5 gram atoms) of sulfur, and 4 grams of powdered potassium hydroxide (2.2% by weight) was stirred and refluxed at 385° to 390° F. Hydrogen sulfide evolved steadily. After 17 hours the hot liquid was decanted from the solid inorganic material on the sides of the flask, and chilled. The p-tolyl trithione was collected on a filter; 32.2 grams (58% yield) melting at 122° C. were recovered. The filtrate gave 36 grams of p-cymene on distillation and left 38 grams of reddish viscous residue.

*Example VI*

A solution of 78 cc. (0.5 mole) of p-cymene, 24 grams (0.75 gram atoms) of sulfur, and 0.5 cc. tri-n-butylamine (0.43% by weight) was refluxed at 178° C. for 16 hours, chilled, and filtered, giving 13.5 grams (48.5% yield) of p-tolyl trithione, melting at 122° C. The filtrate was distilled, giving 30 grams p-cymene and leaving 20 grams of reddish viscous residue. In a modification of this experiment, di-n-butylamine and quinoline were tested as catalysts by comparing the rate of hydrogen sulfide evolution for each catalyst.

*Example VII*

Di-n-butylamine was substituted for tri-n-butylamine in the example above and the reaction rate compared by measuring the respective rates of hydrogen sulfide evolution for each catalyst. The reaction rates were essentially identical.

*Example VIII*

Quinoline was substituted for the catalyst of Example VI. As determined by hydrogen sulfide evolution, the reaction rate with quinoline was about 60% that of tri-n-butylamine.

*Example IX*

A mixture of 236 g. (2 moles) alpha-methylstyrene, 96 g. (3 g. at.) sulfur and 1.97 g. di-orthotolylguanidine was heated at 156° C. After 18 hours it contained no free sulfur. The trithione yield from alpha-methylstyrene was 25%. This yield was improved when, to a solution of 19.2 g. (0.6 g. at.) sulfur and 0.394 g. di-orthotolylguanidine in 95 ml. t-butylbenzene as an inert solvent at 156° C. was added drop wise over 8½ hours, 47.2 g. (0.4 moles) alpha-methylstyrene. The red solution was kept at 156° C. for an additional 16 hours, then cooled to 5°. There crystallized 17.9 g. (70%) 2-phenyl trithione, melting at 120–121°.

Thus, it is evident that my invention provides a valuable means for producing aryl trithiones from readily available saturated alkyl aromatics. The nature of the starting hydrocarbon is essentially limited only by the structure of the alkyl group in relation to the benzenoid ring. The reaction, as described above, requires the use of a base acting catalyst, but as illustrated in the examples any of a wide variety of bases, including weekly basic compounds such as amphoteric metal oxides or salts having a basic reaction as well as strong bases such as the alkali metal and alkaline earth metal oxides and hydroxides may be used. In general, the use of organic bases is preferable because they are usually miscible with the hydrocarbon feed. Any of the usual organic bases; i.e. basic reacting materials, may be used although the material should be sufficiently stable under the reaction conditions (about 140° to 230° C.) to result in useful promotion of the reaction. In this respect, the nitrogen bases, and particularly the di-aryl guanidines have special value.

The aryl trithiones have value in engine lubricant oils as bearing corrosion additives, is E.P. lubricants as E. P. additives, as pharmaceuticals, insecticides, and the like.

This application is a continuation-in-part of my co-pending application S.N. 433,788 filed June 1, 1954, now abandoned.

I claim:
1. A process for the production of aryl substituted trithiones which comprises reacting an alkyl aromatic hydrocarbon, which hydrocarbon contains a benzenoid ring attached to a saturated aliphatic chain of at least three carbon atoms and in which the ring is attached to the second carbon atom of the chain, thus having the structure

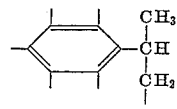

with sulfur at a temperature of about 140–230° C. in the presence of a catalytically effective amount of a basic catalyst.

2. The process of claim 1 in which the catalyst is an organic base stable at 140 to 230° C.

3. The process of claim 2 in which the catalyst is an aryl guanidine.

4. The process of claim 3 in which the catalyst is di-orthotolylguanidine.

5. The process of claim 1 in which the hydrocarbon is a cumene.

6. The process of claim 5 in which the cumene is a para-alkyl substituted cumene.

7. The process of claim 6 in which the substituted cumene is para-cymene.

8. The process of claim 6 in which the substituted cumene is p-t-butyl cumene.

9. The process of claim 5 in which the cumene is unsubstituted cumene.

References Cited in the file of this patent

UNITED STATES PATENTS

| | | |
|---|---|---|
| 2,445,983 | Watson | July 27, 1948 |
| 2,610,980 | Naylor | Sept. 16, 1952 |
| 2,732,346 | Jones | Jan. 24, 1956 |
| 2,748,144 | Hanson et al. | May 29, 1956 |

FOREIGN PATENTS

| | | |
|---|---|---|
| 206,848 | Great Britain | July 10, 1924 |
| 730,058 | Great Britain | May 18, 1955 |

OTHER REFERENCES

E. K. Fields: J. Am. Chem. Soc., vol. 77, pp. 4255–4257 (1955).

UNITED STATES PATENT OFFICE
CERTIFICATE OF CORRECTION

September 22, 1959

Patent No. 2,905,696

Ellis K. Fields

It is hereby certified that error appears in the printed specification of the above numbered patent requiring correction and that the said Letters Patent should read as corrected below.

Column 1, line 54, for "wih" read -- with --; column 3, following the formula between lines 5 to 15, add the following in a centered position, -- 2,3-(methyl-thiophenobenzo) trithione --; column 4, line 2, for "coled" read -- cooled --; line 57, for "36 grams" read -- 63 grams --; column 5, line 29, for "weekly" read -- weakly --; line 43, for "is E.P." read -- in E.P. --.

Signed and sealed this 15th day of March 1960.

(SEAL)
Attest:

KARL H. AXLINE
Attesting Officer

ROBERT C. WATSON
Commissioner of Patents